(12) United States Patent
Wada et al.

(10) Patent No.: US 12,179,458 B2
(45) Date of Patent: Dec. 31, 2024

(54) CLADDING AND METHOD FOR MANUFACTURING THE SAME

(71) Applicant: ASAHI KASEI KABUSHIKI KAISHA, Tokyo (JP)

(72) Inventors: Naoyuki Wada, Tokyo (JP); Yoshinori Yamada, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/010,635

(22) PCT Filed: Jul. 21, 2021

(86) PCT No.: PCT/JP2021/027396
§ 371 (c)(1),
(2) Date: Dec. 15, 2022

(87) PCT Pub. No.: WO2022/034780
PCT Pub. Date: Feb. 17, 2022

(65) Prior Publication Data
US 2023/0311452 A1    Oct. 5, 2023

(30) Foreign Application Priority Data
Aug. 14, 2020    (JP) ................................. 2020-136978

(51) Int. Cl.
*B32B 15/01*    (2006.01)
*B23K 20/08*    (2006.01)
(Continued)

(52) U.S. Cl.
CPC ............ *B32B 15/011* (2013.01); *B23K 20/08* (2013.01); *B32B 7/022* (2019.01); *B32B 15/01* (2013.01);
(Continued)

(58) Field of Classification Search
CPC .......... B23B 15/01; B23B 7/022; B23K 20/08
(Continued)

(56) References Cited

U.S. PATENT DOCUMENTS

| 4,645,720 A | 2/1987 | Pircher et al. |
| 2012/0174760 A1* | 7/2012 | Stefansson ................ B21B 3/00 |
| | | 89/917 |

(Continued)

FOREIGN PATENT DOCUMENTS

| EP | 0 661 126 A1 | 5/1995 |
| JP | 46-4060 B | 2/1971 |

(Continued)

OTHER PUBLICATIONS

Tokuden Co., Ltd., product catalog "Tokuden Top Plate", [online], [searched on Jul. 22, 2020], Internet http://www.tokuden.co.jp/product/top_plate/index.html (A Concise Statement of relevance for this document may be found in the instant application (e.g., at paragraphs [0006] and [0010]); See MPEP 609.04(a)(III)).

(Continued)

*Primary Examiner* — Katherine A Christy
(74) *Attorney, Agent, or Firm* — GREENBLUM & BERNSTEIN, P.L.C.

(57) ABSTRACT

Cladding in which at least two layers of alloys are joined, the cladding having high wear resistance, high workability, and excellent strength at the joining interface of the alloys. The cladding is composed of two or more layers including a first alloy and a second alloy joined to the first alloy. The hardness of the second alloy of the cladding is greater than that of the first alloy, and the difference in hardness between the first alloy and the second alloy is at least HRC 44. When a shearing test based on JIS G 0601 is performed on the cladding, the breakage is on the first alloy side.

13 Claims, 2 Drawing Sheets

(51) Int. Cl.
    *B32B 7/022*     (2019.01)
    *C21D 1/18*     (2006.01)
    *C21D 6/00*     (2006.01)
    *C21D 9/00*     (2006.01)

(52) U.S. Cl.
    CPC ............... *C21D 1/18* (2013.01); *C21D 6/00* (2013.01); *C21D 9/00* (2013.01); *C21D 2221/00* (2013.01); *C21D 2251/02* (2013.01)

(58) Field of Classification Search
    USPC ........................................................ 428/684
    See application file for complete search history.

(56) References Cited

U.S. PATENT DOCUMENTS

| | | | |
|---|---|---|---|
| 2015/0314390 A1 | 11/2015 | Otsuka et al. | |
| 2018/0363093 A1 | 12/2018 | Zhao et al. | |
| 2021/0164761 A1* | 6/2021 | Wolske | C21D 8/0205 |

FOREIGN PATENT DOCUMENTS

| | | |
|---|---|---|
| JP | 03-150345 A | 6/1991 |
| JP | 4-182081 A | 6/1992 |
| JP | 07-18540 A | 7/1995 |
| JP | 2000-108246 A | 4/2000 |
| JP | 2003-301237 A | 10/2003 |
| JP | 2007-054887 A | 3/2007 |
| JP | 2019-505687 A | 2/2019 |
| WO | 2014/178315 A1 | 11/2014 |

OTHER PUBLICATIONS

Nikko Yozai Mfg Co., Ltd., product catalog "Nichia Welding Rod abrasion Resistant Overlay Cladding Super Plate", [online], Dec. 5, 2019, [searched Jul. 22, 2020], Internet https://www.nikko-yozai.co.jp/pamhlet/ (Concise Statement of relevance for this document may be found in the instant application (e.g., at paragraphs [0006] and [0010]); See MPEP 609.04(a)(III)).

International Search Report and Written Opinion of the International Searching Authority issued in International Patent Application No. PCT/JP2021/027396, dated Oct. 12, 2021, along with an English translation thereof.

International Preliminary Report on Patentability issued in International Patent Application No. PCT/JP2021/027396, dated Feb. 7, 2023, along with an English translation thereof.

English partial translation of Tokuden Co., Ltd., product catalog "Tokuden Top Plate", [online], [searched on Jul. 22, 2020], Internet http://www.tokuden.co.jp/product/top_plate/index.html.

English partial translation of Nikko Yozai Mfg Co., Ltd., product catalog "Nichia Welding Rod abrasion Resistant Overlay Cladding Super Plate", [online], Dec. 5, 2019, [searched Jul. 22, 2020], Internet https://www.nikko-yozai.co.jp/pamhlet/.

\* cited by examiner

CLADDING AND METHOD FOR MANUFACTURING THE SAME

FIELD

The present disclosure relates to a cladding in which first and second alloys are bonded, and a method for the production thereof.

BACKGROUND

In production devices for resin and rubber products, various additives are added and raw materials are uniformly mixed and kneaded, and thus, the raw materials and machine parts are in constant contact with each other. Furthermore, crushers used in fields such as waste wood, waste plastic, and tire recycling are in an environment in which the objects to be crushed and the devices are in constant contact with each other. These production devices and crushers require alloys with excellent abrasion resistance in order to improve the life of the devices.

In production devices and crushers, it is effective to increase the surface hardness of the alloy to improve abrasion resistance, and in general, high-hardness steel obtained by applying heat treatment such as quenching to steel materials obtained by adding specific chemical components or alloys to carbon steel has been widely used as abrasion-resistant steel.

However, if the hardness of the alloy is increased to improve abrasion resistance, there are problems such as increased man-hours for screw hole drilling for attachment to a device body and cutting, as well as poor dimensional accuracy. Furthermore, when screw fastening is used for attachment to a device body, there is a problem in that stress is concentrated on the screwed portions, whereby an alloy having a high hardness may crack. When an alloy which has undergone heat treatment such as quenching is metallurgically fastened by welding instead of screw fastening, the alloy is in a re-quenched state in areas where the temperature is locally high due to the influence of welding heat, whereby there is a risk that the hardness will increase significantly, which can lead to cracking. Conversely, the alloy is in an annealed state in areas where heat below the quenching temperature is transferred due to the influence of welding heat, whereby problems such as a decrease in hardness arise and the application thereof to products becomes difficult.

Figure 1:
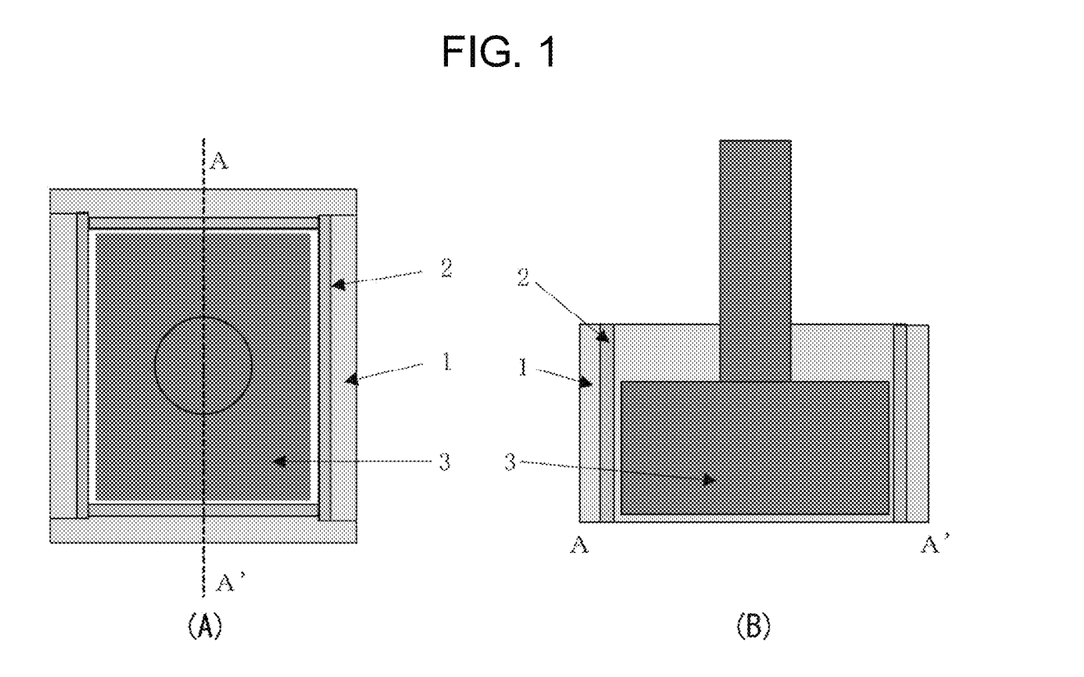
FIG. 1 is a schematic diagram illustrating an example of the use of the cladding according to the present disclosure in manufacturing equipment such as extrusion and kneading equipment.

For example, among production devices such as kneaders and crushers, as shown in FIG. 1, since the inner members (2) for extruding raw material and waste material come into intense contact with the wall surface of the extruder (3) and are exposed to a severe abrasive sliding environment, there is a demand for thick plates of a high hardness steel which can be used for long periods time even after a certain amount of wear. Conversely, the outer members (1) fastened thereto do not require abrasion resistance and sliding resistance, and a soft and easy-to-work alloy for mechanical fastening or metallurgical fastening is required. Specifically, in the production devices as described above, a cladding in which alloys different extremely in hardness are strongly bonded together is required.

There are some prior art publications aiming to solve the above problems by bonding an alloy having a high hardness and abrasion resistance to one surface of a soft alloy having high workability. For example, in Non-Patent Literature 1 and 2, an abrasion-resistant alloy or the like is overlay-welded onto one surface of general-purpose soft carbon steel. Thus, processing of these alloys is considered easy, but cracks and defects can occur during overlay welding, and cracks may develop during use in production devices, crushers, etc., due to the application of strong impact and sliding, whereby shed build-up may enter the production device as impurities. Furthermore, delamination from the bonding interface may occur starting from welding defects.

The claddings disclosed in Patent Literature 1 and 2 are claddings of a steel material having a high hardness and abrasion resistance and a steel material with relatively low hardness, and imparting impact resistance is mentioned. However, there are no descriptions regarding the strength of the bonding surface, and the workability is inferior because the hardness difference between the steel materials is small. Furthermore, Patent Literature 3 describes a cladding of an abrasion-resistant stainless steel and carbon steel. However, the hardness of stainless steel is low, and the cladding does not seem able to withstand use in severe environments where devices contact each other intensely because of the insufficient abrasion resistance thereof.

Furthermore, in the Examples of the claddings disclosed in Patent Literature 1, abrasion-resistant metal powder is arranged on a metal molded body, and the two are integrated by hot pressing. However, the shape and the size are limited and it is considered difficult to strongly bond metals different in mechanical properties by hot pressing. Conversely, in the Examples of the claddings disclosed in Patent Literature 2 and 3, the claddings are produced by hot rolling or cold rolling. However, the steel material is considered to reach a state of being quenching heat-treated due to the heat input during hot rolling, and if a temperature gradient occurs during this hot rolling and the hardness becomes insufficient, for example, the steel must be annealed to restore the hardness and then quenching heat-treated again, and thereby manufacturing man-hours are required and costs increase. Furthermore, even in the case of cold rolling, a high temperature is imparted to the bonding surface, but the steel is not uniformly heated throughout, which may require a reheating step as described above. Further, since cold rolling is limited to the production of thin sheets, the production of relatively thick plates as in kneading and crushing devices is not possible.

CITATION LIST

Patent Literature

[PTL 1] Japanese Unexamined Patent Publication (Kokai) No. 2000-108246

[PTL 2] Japanese Unexamined Patent Publication (Kokai) No. 2003-301237

[PTL 3] Japanese Unexamined Patent Publication (Kokai) No. 4-182081

Non-Patent Literature

[NPL 1] Tokuden Co., Ltd., product catalog "Tokuden Top Plate", [online], [searched on Jul. 22, 2020], Internet <http://www.tokuden.co.jp/product/top_plate/index.html>

[NPL 2] Nikko Yozai MFG Co., Ltd., product catalog "Nichia Welding Rod abrasion Resistant Overlay Cladding SUPER PLATE", [online], Dec. 5, 2019, [searched Jul. 22, 2020], Internet <https://www.nikko-yozai.co.jp/pamhlet/>

SUMMARY

Technical Problem

The present disclosure aims to provide a cladding in which at least two alloy layers are bonded, which has high abrasion resistance and high workability, and which has excellent strength at the alloy bonding interface.

Solution to Problem

Figure 2:
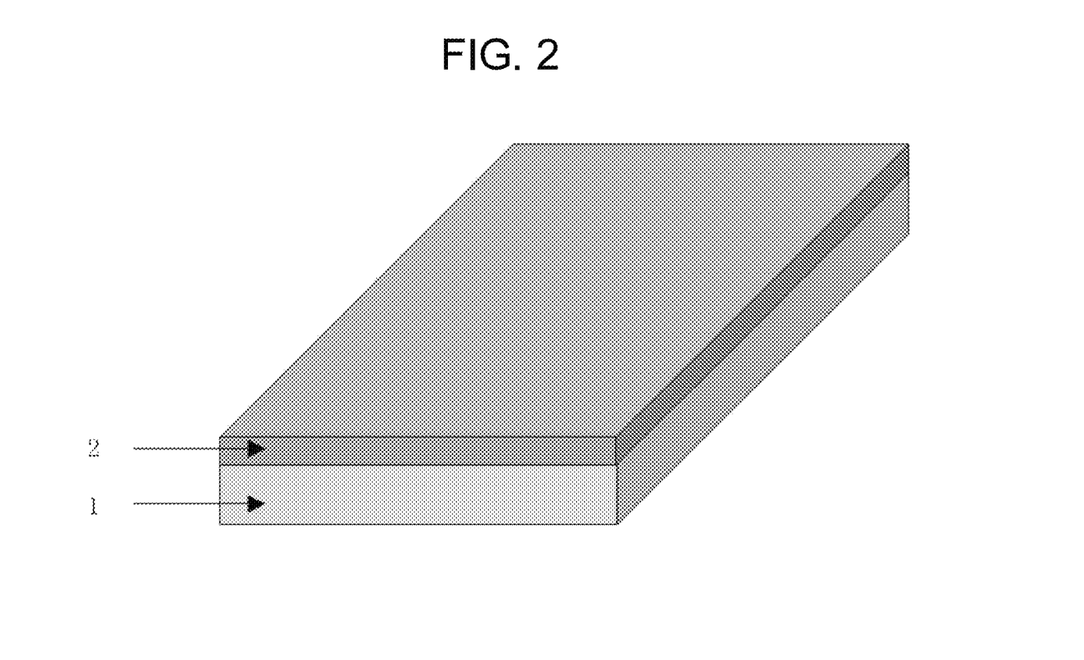
FIG. 2 is a schematic diagram illustrating the appearance of the cladding according to the present disclosure.

As a result of rigorous investigation in order to achieve the object described above, the present inventors have newly discovered that, as schematically shown in FIG. 2, both high-level abrasion resistance and workability can be achieved by a cladding in which an alloy (1), which has low hardness and excellent workability, is bonded to an alloy (2), which has high hardness.

[1]
A cladding, comprising two or more layers including a first alloy and a second alloy bonded to the first alloy, wherein the second alloy has a hardness greater than that of the first alloy, the difference in the hardness between the first alloy and the second alloy is HRC 44 or more, and when a shear test in accordance with JIS G 0601 is performed on the cladding, breakage occurs on a first alloy side.

[2]
The cladding according to Item 1, wherein when the cladding is inspected by the bottom echo method of the ultrasonic flaw detection test of JIS G 0601, no defects occur in a bonding interface between the first alloy and the second alloy.

[3]
The cladding according to Item 1 or 2, wherein when the cladding is inspected by the penetrant testing of ASME BPVC-VIII, a surface of the cladding is free of indication patterns, and a cross-section of the cladding is free of indication patterns having a length which exceeds three times its width, is free of circular or elliptical indication patterns exceeding 5 mm, and does not have 4 or more indication patterns arranged in a straight line with an interval of 1.5 mm or less from end to end.

[4]
The cladding according to any one of Items 1 to 3, wherein the hardness of the first alloy is HRC 5 or less.

[5]
The cladding according to any one of Items 1 to 4, wherein the first alloy and the second alloy are directly bonded.

[6]
The cladding according to any one of Items 1 to 5, wherein a wave height at the bonding interface between the first alloy and the second alloy is 30 μInto 100 pm.

[7]
A method for the production of a cladding, comprising:
bonding a first alloy and a second alloy by explosive welding, and
subjecting the bonded second alloy to quenching and tempering heat treatment to harden the second alloy, such that the second alloy has a hardness greater than that of the first alloy and the difference in the hardness between the first alloy and the second alloy is HRC 44 or more.

[8]
A method for the production of a cladding, comprising:
bonding a first alloy and a second alloy by explosive welding, and
subjecting the bonded second alloy to solution treatment and an aging heat treatment to harden the second alloy, such that the second alloy has a hardness greater than that of the first alloy and the difference in the hardness between the first alloy and the second alloy is HRC 44 or more.

[9]
Use of a cladding, comprising chemically or mechanically fastening the first alloy of the cladding according to any one of Items 1 to 6 to equipment, and exposing the second alloy to an Advantageous Effects of Invention According to the present disclosure, it is possible to provide a cladding which has high abrasion resistance and high workability and which has excellent strength at the alloy bonding interface. Thus, the abrasion-resistant cladding according to the present disclosure can be used in vehicles, construction equipment, and structures such as heavy machinery, which require both high abrasion resistance and workability, and for example, it can be used for applications which require one side to have high abrasion resistance and the other side to have high workability and weldability for fastening equipment, such as the walls of the manufacturing equipment and crushers shown in FIG. 1.

DESCRIPTION OF EMBODIMENTS

Cladding

Hardness Difference

The embodiment of the present disclosure (hereinafter referred to as the "present embodiment") will be described in detail. The cladding of the present embodiment comprises a first alloy and a second alloy bonded to the first alloy, wherein the hardness of the second alloy is greater than that of the first alloy, and specifically, the second alloy is an alloy having abrasion resistance, and the first alloy is an alloy having excellent workability and weldability. It is crucial that the hardness difference between the first alloy and the second alloy be HRC (Rockwell hardness) 44 or more. In general kneaders and crushers where abrasion and sliding loads are applied, alloys having high abrasion resistance and hardness are used. In order to prevent deterioration and wear due to abrasion and the contamination of impurities due to the same, it is preferable to use an alloy having an HRC of 44 or more for the alloy (second alloy) that is subjected to abrasion and sliding load, because it can withstand long-term use even in severe abrasion-resistant environments. Conversely, when the HRC is less than 44, though the material can withstand use as a device member for a certain period of time, the life is significantly reduced in severe environments where high abrasion resistance is required. Furthermore, it is important that the other alloy (first alloy) of the cladding has a sufficiently lower hardness than the second alloy in order to improve workability and weldability. Thus, in order to achieve both high abrasion resistance and workability, the hardness difference between the first alloy and the second alloy is HRC 44 or more.

The hardness of the first alloy is preferably HRC 0 to 5, more preferably HRC 0 to 4, and further preferably HRC 0 to 3 in order to achieve high workability. To improve abrasion resistance and prevent cracking, the hardness of the second alloy is preferably HRC 44 to 75, more preferably HRC 48 to 70, and further preferably HRC 50 to 65.

In order to achieve both high abrasion resistance and workability, the lower limit of the hardness difference between the first alloy and the second alloy may preferably be HRC 45 or more, HRC 46 or more, HRC 47 or more, HRC 48 or more, HRC 49 or more, HRC 50 or more, HRC 51 or more, HRC 52 or more, HRC 53 or more, or HRC 54 or more.

As used herein, the term "abrasion" is defined as the gradual loss of weight of a solid surface portion due to friction, which is the removal of surface material by friction. Mechanically, wear is caused by the combination of mechanical contact between metal surfaces which move relative to each other, metallic adhesion, etc. and "abrasion resistant alloy" is defined as an alloy that is resistant thereto. Generally speaking, it is known that the abrasion resistance of quenched/tempered, solution treated/aged alloy is proportional to its hardness. It is desirable to use the carbon tool steel specified in JIS G 4401, high-speed tool steel specified in JIS G 4403, alloy tool steel specified in JIS G 4404, rolled materials of corrosion-resistant heat-resistant ultra-alloy, nickel, and nickel alloy specified in JIS G 4902, hot-rolled stainless-steel plate specified in JIS G 4304, for example, SKD61 as the alloy used as the second alloy (the abrasion resistant alloy). Examples of alloys having abrasion resistance by solution treatment and aging treatment include nickel alloys, preferably nickel alloys containing primarily nickel as well as chromium, iron, and carbon. "Primarily" means that it accounts for 50 wt % or more of the alloy composition. As alloys having abrasion resistance, alloys which are subjected to age-hardening (precipitation hardening) in which an intermetallic compound precipitates from the structure and hardens are known, and these can also be used as the abrasion resistant alloy.

The alloy used as the first alloy is preferably carbon steel or low hardness alloy, more preferably low carbon steel. The term "low carbon steel" refers to, among carbon steels, alloys having low carbon content, generally having a carbon content (weight percent concentration) of 0.25 wt % or less. It is known that the properties of low carbon steel do not change significantly even after heat treatment due to its low carbon content. For example, in the case of hardening the entire cladding by heat treatment such as quenching/tempering, solution treatment/aging treatment, etc., in order to impart the second alloy of the cladding with abrasion resistance, if a steel material with a high carbon content is used for the first alloy, the heat treatment may also harden the first alloy, resulting in a decrease in workability. When low carbon steel having a low carbon content is used as the first alloy, it is unlikely to harden even if heat treatment is performed, whereby high workability can be maintained. As examples of low carbon steel, among rolled steel for general structures as defined in JIS G 3101, such as SS400, rolled steel for welded structures as defined in JIS G 3106, and carbon steel for machine structures as defined in JIS G 4051, those having a low carbon content are desirably used, and alloys other than those described above may be used as long as they have a low carbon content and are excellent in workability and weldability.

As a combination of the first alloy and the second alloy, in order to produce a cladding which can achieve both abrasion resistance and workability at a higher level, it is effective to use, as the second alloy, a quenched steel having a hardness which is increased by quenching, preferably quenched steel in which martensite structure is obtained by quenching from the austenite single phase region, and as the first alloy, low carbon steel, which is resistant to deterioration by heat treatment, i.e., has a small increase in hardness. It is considered that the use of low carbon steel for the first alloy to produce the cladding has the advantage of reducing costs and processing man-hours compared to constructing devices from a single material of abrasion resistant alloy.

In the present embodiment, the "bond" between the second alloy and the first alloy encompasses both a structure in which the second alloy is directly bonded to a surface of the first alloy, and a structure in which the second alloy and the first alloy are indirectly bonded via one or more intermediate materials other than the first alloy and the second alloy. The intermediate material is not limited to steel materials and examples thereof include titanium and alloys thereof, nickel and alloys thereof, other metal materials and alloys thereof, and non-ferrous metal materials. When low carbon steel is used as the first alloy and a quenched steel having a hardness which is increased by quenching is used as the second alloy, a material having a high strength at high temperatures, such as nickel or a nickel alloy, can be used, and from the viewpoint of the mechanical strength of the bonding interface, it is more preferable that the second alloy be directly bonded to the surface of the first alloy. In the technical field of cladding, of alloys to be bonded, the thicker alloy is sometimes referred to as "base material" and the thinner alloy is sometimes referred to as "cladding material." In the present disclosure, the first alloy can be the base material and the second alloy can be the cladding material, or the second alloy can be the base material and the first alloy can be the cladding material.

Bonding Interface

The cladding of present embodiment breaks on the first alloy side when the shear test of JIS G 0601 is performed. Specifically, it is preferable that a first alloy having relatively low hardness be destroyed in the shear test before delamination occurs at the bonding interface between the first alloy and the second alloy. When an intermediate material is interposed between the first alloy and the second alloy, for the "breaks on the first alloy side", it is preferable that the first alloy or intermediate material with relatively low hardness be destroyed before delamination occurs at the bonding interface between the second alloy and the intermediate material or at the bonding interface between the intermediate material and the first alloy. In other words, the mechanical strength of the bonding interfaces in the JIS G 0601 shear test is higher than the mechanical strength of the intermediate material and the first alloy. This feature makes the bond between the first alloy and the second alloy stronger, and can withstand long-term use even in severe abrasion-resistant environments. "Shear strength" is a value obtained from the results of the shear strength test of the cladding test method specified in the JIS G 0601. When, for example, low carbon steel such as SS400 is used as the first alloy, the shear strength of the cladding of the present embodiment is greater than 230 MPa, preferably greater than 400 MPa, more preferably 410 MPa or greater, and further preferably 420 MPa or greater.

Figure 3:
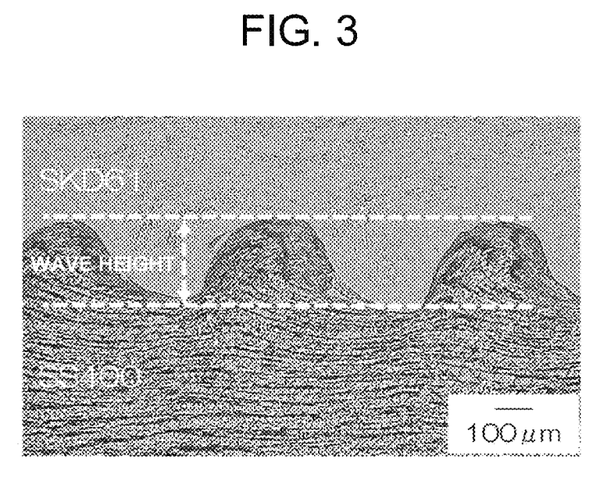
FIG. 3 is a photograph detailing the definition of wave height at the bonding interface.

In the shear test, as the method of configuring the cladding to break on the first alloy side before the delamination of the bonding interface, the wave height at the bonding interface between the first alloy and the second alloy is preferably adjusted to 30 µm to 1000 µm (1 mm), more preferably 40 µm to 800 µm, and further preferably 50 to 600 µm. When the wave height is greater than 30 µm, the bonding area is increased and a strong bonding interface is obtained. Furthermore, when the wave height is 1000 µm or less, it is possible to suppress the formation of an alloy layer at the bonding interface due to plastic deformation and thermal effects during bonding, whereby the bond part is made hard and brittle, causing microcracks. Likewise, in the case in which an intermediate material is interposed between the first alloy and the second alloy, the wave height at the bonding interface between the first alloy and the intermediate material and the wave height at the bonding interface between the intermediate material and the second alloy are preferably adjusted to 30 to 1000 µm (1 mm), more preferably 40 to 800 µm, and further preferably 50 to 600 µm. In the present disclosure, the "wave height" at the bonding interface, as shown in FIG. 3, refers to the difference in height from the crest to the trough of the waveform at the bonding interface. The wave-like shape of the bonding interface can be formed by bonding the first alloy and the second alloy by explosive welding. In the present embodiment, the wave height is measured by processing the cladding subjected to explosive welding into a desired shape and measuring a cross section including the bond part using an electron microscope. In the measurement, ten arbitrary points at the bonding interface are measured and the average value thereof is obtained.

Defects/Indication Pattern

The cladding of present embodiment preferably has no defects at the bonding interface between the first alloy and the second alloy when inspected by the bottom echo method of the ultrasonic inspection of JIS G 0601. Since there are no defects at the bonding interface between the first alloy and the second alloy, the bond between the first alloy and the second alloy is stronger, whereby it can withstand long-term use even in severe abrasion-resistant environments.

The cladding of the present embodiment preferably does not have indication patterns on the surface of the cladding when an ASME BPVC-VIII penetrant test is performed. Furthermore, in a cross-section of the cladding, the absence of indication patterns having a length which exceeds three times the width, the absence of circular or elliptical indication patterns exceeding 5 mm, and the absence of four or more indication patterns arranged in a straight line with an interval of 1.5 mm or less from end to end are preferable. "Indication pattern" means a pattern which visually observed as a result of penetration of the penetrant liquid used in the penetrant flaw detection test into defects present on the observation surface. The permeate is typically red. The absence of indication patterns means that defects are not visually observed. The size of circular or elliptical indication patterns indicates the maximum dimension (i.e., the diameter of a circle or the major axis of an ellipse) when the indication pattern is hypothesized as a circle or an ellipse. It is preferable that the cladding not have continuous indication patterns, but if any are present, it is preferable that there not be four or more continuous patterns at intervals of 1.5 mm or less on a substantially straight line. This allows the cladding to withstand long-term use in severe abrasion-resistant environments.

Method for Manufacturing Cladding

Explosive Welding

In the method for manufacturing cladding of the present embodiment, it is important to harden the second alloy by heat treatment after bonding the second alloy to the first alloy. Since hardening heat-treatment is performed after bonding, the bonding method should preferably be cold bonding without heat load, and more preferably bonding by explosive welding. If the second alloy is cold-bonded to the first alloy after hardening heat treatment, the abrasion resistant second alloy may crack, but by bonding with the first alloy in the cold before hardening heat treatment of the second alloy and thereafter performing the hardening heat treatment, high hardness can be imparted to the second alloy, and a strong bond can be obtained without cracking. For a cladding produced using explosive welding, for example, cold rolling without heating is performed after explosive welding, and a cladding having a predetermined thickness may be produced and then heat-treated. For bonding between alloys for which direct bonding is difficult, or for a cladding in which a large heat load is applied when used as a product, an intermediate material may be used between the alloys, and the intermediate material is not limited to steel materials, and as examples thereof, titanium and alloys thereof, nickel and alloys thereof, other metal materials and alloys thereof, and non-ferrous metal materials may be used.

When one or more intermediate materials are present between the first alloy and the second alloy, these materials may be bonded together in one explosive welding, or after bonding the intermediate material to the first alloy by explosive welding, the second alloy may be bonded by explosive welding onto the intermediate material. Alternatively, the intermediate material can be explosively welded to the second alloy and then explosively welded to the first alloy. Alternatively, the first alloy, the intermediate material, and the second alloy may be explosively welded simultaneously.

Explosive welding is one of metal bonding methods which utilize the high pressure of explosives, and is a technique which can particularly strongly bond dissimilar metals together. The major feature of this technique is that almost no heat is applied to the metal material and relatively thick materials exceeding 10 mm can be bonded, whereby it is possible to strongly bond a combination of metals or thick metals that cannot be bonded by normal methods. It is known as a strong bonding mechanism that the bonding interface of metals bonded by explosive welding exhibits a peculiar wavy shape, which is reportedly caused by the bond area being larger than the straight bonding interface. The height of the waves (wave height) is as described above.

The explosives used for the explosive welding are explosives which generate detonation waves. In order to strongly bond the metal plates, it is preferable to use an explosive having a detonation speed of 1000 m/s or more, and it is more preferable to use an explosive of 1,500 m to 3,000 m/sec, which is ⅓ to ½ the speed of sound in metal, in order to obtain a more optimum bonding force. Specific examples of the explosive include ammonium nitrate and nitrate esters PETN (pentaerythritol tetranitrate) and nitroglycerin, nitro compounds such as TNT (trinitrotoluene), nitramine cyclotrimethylenetrinitramine, and cyclotetramethylenetetranitramine, and these may be used alone or in combination with other explosive components or other components other than explosives.

Heat Treatment

The heat treatment of the present embodiment means a hardening heat treatment of the second alloy, which is performed after explosive welding. By performing heat treatment on the bonded second alloy side, primarily only the second alloy may be hardened, and the hardness difference may be adjusted to HRC 44 or more. Preferably, by using a material such as low carbon steel, which is unlikely to harden by heat treatment, as the first alloy, primarily the second alloy is hardened while heat treating the whole of the first alloy and the second alloy and the hardness difference is adjusted to HRC 44 or more. Examples of the heat treatment method include, generally: after austenitization, performing a quench-hardening treatment obtained by cooling under conditions suitable for transformation to martensite or bainite; after the quench hardening described above, or in order to obtain the required properties, soaking at a specific temperature one or more times after heat treatment, and subsequently tempering by cooling at an appropriate rate; and after rapid cooling, cold working, etc., performing age-hardening treatment for changing the properties of the alloy (e.g., hardness, etc.) with the passage of time. The method of the heat treatment and the temperature/time thereof are as specified by the JIS standards, and for example, in the case of alloy tool steel SKD61 specified in JIS G 4404, a steel material of HRC 50 or more can be obtained by performing heat treat by air-cooling at a quenching temperature of 1030° C. and air-cooling tempering at 550° C. Although heat treatment is performed after explosive welding in the present embodiment, anything other than SKD61 may be used as long as the hardness of the second alloy is higher than that of the first alloy and the hardness difference between the first alloy and the second alloy is HRC 44 or more after heat treatment. In the case of imparting higher hardness to the second alloy, surface treatments such as carburizing quenching, flame quenching, induction quenching, nitriding, and salt bath nitrocarburizing according to JIS G 0201 may be combined. In one embodiment, the hardened layer is several mm or more from the surface compared to carburizing quenching, flame quenching, induction quenching, or nitriding treatment as described above, whereby the life of the production device can be extended. Considering the life in use, the thickness of the hardened layer is preferably 3 mm or more from the surface, more preferably 5 mm or more from the surface, and more preferably the entire second alloy is hardened.

EXAMPLES

The Examples and Comparative Examples of the present disclosure are shown below, but the present disclosure is not limited to these Examples and Comparative Examples.

Measurement and Evaluation Methods

Hardness and Hardness Difference

HRC (Rockwell hardness) is measured in accordance with the Rockwell hardness test of JIS Z 2245.

Shear Test

The shear test is defined in accordance with the cladding test method of JIS G 0601. A test sample is observed after the shear test, and when the first alloy is adhered to the second alloy, it is judged as breakage on the first alloy side. It is determined that there is delamination of the bonding interface when there is no adhesion of the first alloy to the second alloy and the bond surface is exposed. For claddings having an intermediate material, when the intermediate material is attached to the second alloy, or when the intermediate material is attached to the first alloy, it can be determined that the breakage is on the first alloy side. Furthermore, when there is no intermediate material attached to the second alloy and both bond surfaces are exposed, or if there is no adhesion of the first alloy to the intermediate material and both bond surfaces are exposed, it can be determined that delamination of the bonding interface has occurred.

Wave Height

The explosively welded cladding is processed into a 20×20×20 block shape including the bonding interface, and the cross section including the bond portion is measured using an electron microscope. For the measurement, approximately 10 arbitrary points of the bonding interface are measured, and the average value thereof is obtained.

Ultrasonic Testing

An ultrasonic defect detection test is carried out in accordance with the ultrasonic defect detection test specified in the test method for cladding steel of JIS G 0601. When the propagation time is displayed on the horizontal axis and the sound pressure is displayed on the vertical axis, if the bottom echo height is set to 80% and the interface echo height is 40% or more and no defect echo is detected, it is judged that there are no defects.

Penetrant Testing

Penetrant testing is performed on the surface and cross section of the cladding in accordance with ASME BPVC-VIII-1 or an equivalent standard. A cross section of the cladding is milled or polished, and the observation surface is cleaned. The size and number of the detected red indication patterns are measured using a measuring instrument such as a vernier caliper.

Example 1

100 mm thickness SS400, which is a general structural rolled steel specified in JIS G 3101, was used as the first alloy having excellent workability and weldability, and 8 mm thickness SKD61, which is an alloy tool steel specified in JIS G 4404, was used as the second alloy, which is an abrasion resistant alloy. A predetermined gap was provided between the second alloy and the first alloy, a powdered explosive including ammonium nitrate as a main component was arranged with a predetermined thickness, and explosive welding was performed by detonating the explosive with a detonator having a diameter of 6 mm. As a result, the second alloy and the first alloy were bonded, and as a result of the ultrasonic flaw detection test (JIS G 0601, bottom echo method), the bonding was determined the entire surface bonding with no defects.

Next, after quenching the cladding produced by explosive welding at 1,030° C., tempering heat treatment was performed twice at 550° C. The surface hardness of the second alloy (SKD61) was HRC 50 or more, and the first alloy (SS400) maintained the initial hardness of HRC 0 to 1.

Next, as a result of conducting an ultrasonic flaw detection test (JIS G 0601, bottom echo method) on the cladding after the heat treatment described above, the bond was determined the entire surface bond with no defects. Furthermore, penetrant testing (ASME BPVC-VIII-1) was conducted on the cross-section of the bond surface of the heat-treated cladding, and no indication pattern was detected on the surface and cross-section of the cladding, and the bond was maintained over the entire surface without defects or delamination. The wave height at the bonding interface was 450 µm.

Next, a total of four shear-test test samples were cut from the cladding and subjected to the shear test (JIS G 0601). As a result, as shown in Table 1, the average value of the shear strength was approximately 420 MPa, in all of the samples, breakage occurred on the first alloy (SS400) side, and the bonding interface strength was sufficient.

In order to install the cladding in a production device, the cladding was cut along the outer circumference and plate thickness direction, screw holes were drilled on the SS400 side, and the cladding was welded, and it was shown that the cladding could easily be processed by cutting and welding into a predetermined shape, and that there were no problems in using it as a product. From the above results, it was confirmed that the cladding of Example 1 has abrasion resistance and high workability.

Example 2

20 mm thickness SM490A, which is a rolled steel for welded structures specified in JIS G 3106, was used as the first alloy having excellent workability and weldability, and 6 mm thickness SKD1, which is an alloy tool steel specified in JIS G 4404, was used as the second alloy, which is an abrasion resistant alloy. A predetermined gap was provided between the second alloy and the first alloy, a powdered explosive including ammonium nitrate as a main component was arranged with a predetermined thickness, and explosive welding was performed by detonating the explosive with a detonator having a diameter of 6 mm. As a result, the second alloy and the first alloy could be bonded, and as a result of the ultrasonic flaw detection test (RS G 0601, bottom echo method), the bond was determined the entire surface bond with no defects.

Next, after quenching the cladding produced by explosive welding at 970° C., tempering heat treatment was performed once at 180° C. The surface hardness of the second alloy (SKD1) was HRC 63 or more, and the first alloy (SM490A) maintained the initial hardness of HRC 0 to 1.

Next, as a result of conducting an ultrasonic flaw detection test (JIS G 0601, bottom echo method) on the cladding after the heat treatment described above, the bond was determined the entire surface bond with no defects. Furthermore, penetrant testing (ASME BPVC-VIII-1) was conducted on the cross-section of the bond surface of the heat-treated cladding, and no indication pattern was detected on the surface and cross-section of the cladding, and the bond was maintained over the entire surface without defects or delamination. The wave height at the bonding interface was 620 µm.

Next, a total of four shear-test test samples were cut from the cladding and subjected to the shear test (JIS G 0601). As a result, as shown in Table 1, the average value of the shear strength was approximately 455 MPa, in all of the samples, breakage occurred on the first alloy (SM490A) side, and the bonding interface strength was sufficient.

In order to install the cladding in a production device, the cladding was cut along the outer circumference and plate thickness direction, screw holes were drilled on the SM490A side, and the cladding was welded, and it was shown that the cladding could easily be processed by cutting and welding into a predetermined shape, and that there were no problems in using it as a product. From the above results, it was confirmed that the cladding of Example 2 has abrasion resistance and high workability.

Example 3

55 mm thickness SS400, which is a general structural rolled steel specified in JIS G 3101, was used as the first alloy having excellent workability and weldability, and 10 mm thickness SUS420J2, which is a hot-rolled stainless-steel sheet specified in JIS G 4304, was used as the second alloy, which is an abrasion resistant alloy. A predetermined gap was provided between the second alloy and the first alloy, a powdered explosive including ammonium nitrate as a main component was arranged with a predetermined thickness, and explosive welding was performed by detonating the explosive with a detonator having a diameter of 6 mm. As a result, the second alloy and the first alloy could be bonded, and as a result of the ultrasonic flaw detection test (JIS G 0601, bottom echo method), the bond was determined the entire surface bond with no defects.

Next, after quenching the cladding produced by explosive welding at 1,030° C., tempering heat treatment was performed once at 300° C. The surface hardness of the second alloy (SUS420J2) was HRC 44 or more, and the first alloy (SS400) maintained the initial hardness of HRC 0 to 1.

Next, as a result of conducting an ultrasonic flaw detection test (JIS G 0601, bottom echo method) on the cladding after the heat treatment described above, the bond was determined the entire surface bond with no defects. Furthermore, penetrant testing (ASME BPVC-VIII-1) was conducted on the cross-section of the bond surface of the heat-treated cladding, and no indication pattern was detected on the surface and cross-section of the cladding, and the bond was maintained over the entire surface without defects or delamination. The wave height at the bonding interface was 250 µm.

Next, a total of four shear-test test samples were cut from the cladding and subjected to the shear test (JIS G 0601). As a result, as shown in Table 1, the average value of the shear strength was approximately 445 MPa, in all of the samples, breakage occurred on the first alloy (SS400) side, and the bonding interface strength was sufficient.

In order to install the cladding in a production device, the cladding was cut along the outer circumference and plate thickness direction, screw holes were drilled on the SS400 side, and the cladding was welded, and it was shown that the cladding could easily be processed by cutting and welding into a predetermined shape, and that there were no problems in using it as a product. From the above results, it was confirmed that the cladding of Example 3 has abrasion resistance and high workability.

Example 4

30 mm thickness SM490A, which is a rolled steel for welded structures specified in JIS G 3106, was used as the first alloy having excellent workability and weldability, and 10 mm thickness NCF718, which is a rolled material of a corrosion-resistant, heat-resistant superalloy, nickel, and a nickel alloy specified in JIS G 4902, was used as the second alloy, which is an abrasion resistant alloy. A predetermined gap was provided between the second alloy and the first alloy, a powdered explosive including ammonium nitrate as a main component was arranged with a predetermined thickness, and explosive welding was performed by detonating the explosive with a detonator having a diameter of 6 mm. As a result, the second alloy and the first alloy could be bonded, and as a result of the ultrasonic flaw detection test (JIS G 0601, bottom echo method), the bond was determined the entire surface bond with no defects.

Next, after quenching the cladding produced by explosive welding at 1000° C., aging heat treatment was performed at 718° C. and 620° C. The surface hardness of the second alloy (NCF718) was HRC 47 or more, and the first alloy (SM490A) maintained the initial hardness of HRC 0 to 1.

Next, as a result of conducting an ultrasonic flaw detection test (JIS G 0601, bottom echo method) on the cladding after the heat treatment described above, the bond was determined the entire surface bond with no defects. Furthermore, penetrant testing (ASME BPVC-VIII-1) was conducted on the cross-section of the bond surface of the heat-treated cladding, and no indication pattern was detected on the surface and cross-section of the cladding, and the bond was maintained over the entire surface without defects or delamination. The wave height at the bonding interface was 130 μm.

Next, a total of four shear-test test samples were cut from the cladding and subjected to the shear test (JIS G 0601). As a result, as shown in Table 1, the average value of the shear strength was approximately 510 MPa, in all of the samples, breakage occurred on the first alloy (SM490A) side, and the bonding interface strength was sufficient.

In order to install the cladding in a production device, the cladding was cut along the outer circumference and plate thickness direction, screw holes were drilled on the SM490A side, and the cladding was welded, and it was shown that the cladding could easily be processed by cutting and welding into a predetermined shape, and that there were no problems in using it as a product. From the above results, it was confirmed that the cladding of Example 4 has abrasion resistance and high workability.

Comparative Example 1

The basic conditions, explosive welding conditions, and heat treatment conditions were the same as in Example 1, but the production steps of Example 1 were replaced. Specifically, explosive welding was performed after quenching and tempering heat treatment, and though a bond was achieved between the second alloy and the first alloy, a large number of cracks were found on the surface of the second alloy, which is the abrasion resistant alloy, and thus, the cladding could not be used as a product.

Comparative Example 2

10 mm thickness SUS304, which is a hot-rolled stainless-steel sheet specified in JIS G 4304, was used as the first alloy, and 5 mm thickness SKD11, which is an alloy tool steel specified in JIS G 4404, was used as the second alloy, which is an abrasion resistant alloy. A predetermined gap was provided between the second alloy and the first alloy, a powdered explosive including ammonium nitrate as a main component was arranged with a predetermined thickness, and explosive welding was performed by detonating the explosive with a detonator having a diameter of 6 mm. As a result, the second alloy and the first alloy could be bonded, and as a result of the ultrasonic flaw detection test (JIS G 0601, bottom echo method), the bond was determined the entire surface bond with no defects.

Next, after quenching the cladding produced by explosive welding at 1,030° C., tempering heat treatment was performed once at 180° C. The surface hardness of the second alloy (SKD11) was HRC 59 or more, and the first alloy (SUS304) increased in hardness from the initial hardness to HRC 26.

Next, as a result of conducting an ultrasonic flaw detection test (JIS G 0601, bottom echo method) on the cladding after the heat treatment described above, the bond was determined the entire surface bond with no defects. Furthermore, penetrant testing (ASME BPVC-VIII-1) was conducted on the cross-section of the bond surface of the heat-treated cladding, and no indication pattern was detected on the surface and cross-section of the cladding, and the bond was maintained over the entire surface without defects or delamination. The wave height at the bonding interface was 100 μm.

Next, a total of four shear-test test samples were cut from the cladding and subjected to the shear test (JIS G 0601). As a result, as shown in Table 1, the average value of the shear strength was approximately 550 MPa, in all of the samples, breakage occurred on the first alloy (SUS304) side, and the bonding interface strength was sufficient.

In order to install the cladding in a production device, the cladding was cut along the outer circumference and plate thickness direction, screw holes were drilled on the SUS304 side, and the cladding was welded. However, since SUS304 itself has a high hardness, it is difficult to process it into a predetermined shape, resulting in an increase in processing man-hours and the occurrence of weld cracks, and thus, the cladding could not be used as a product.

TABLE 1

| | Cladding Material/ Base Material (Thickness) | Production Process | Hardness Before Explosive Welding | Product Hardness | Hardness Difference | Shear Strength (Avg Val)/ Break Location | Wave Height | Workability (cutting, welding) |
|---|---|---|---|---|---|---|---|---|
| Ex 1 | SKD61/SS400 (8 mm/100 mm) | Explosive welding → Quenching→ Tempering × 2 times | SKD61:HRC17 SS400:HRC1 | SKD61:HRC54 SS400:HRC0 | 54 | 420 MPa/ SS400 | 450 μm | Good |
| Ex 2 | SKD1/SM490A (6 mm/20 mm) | Explosive welding → Quenching→ Tempering × 1 time | SKD1:HRC25 SM490A:HRC1 | :HRC63 SM490A:HRC0 | 63 | 455 MPa/ SM490A | 620 μm | Good |
| Ex 3 | SUS420J2/SS400 (10 mm/55 mm) | Explosive welding → Quenching→ Tempering × 1 time | SUS420J2:HRC22 SS400:HRC0 | SUS420J2:HRC44 SS400:HRC0 | 44 | 445 MPa/ SS400 | 250 μm | Good |
| Ex 4 | NCF718/SM490A (10 mm/30 mm) | Explosive welding → Solution treatment → Aging treatment | NCF718:HRC36 SM490A:HRC1 | NCF718:HRC47 SM490A:HRC1 | 46 | 510 MPa/ SM490A | 130 μm | Good |

TABLE 1-continued

| | Cladding Material/ Base Material (Thickness) | Production Process | Hardness Before Explosive Welding | Product Hardness | Hardness Difference | Shear Strength (Avg Val)/ Break Location | Wave Height | Workability (cutting, welding) |
|---|---|---|---|---|---|---|---|---|
| Comp Ex 1 | SKD61/SS400 (8 mm/100 mm) | Quenching→ Tempering × 2 times→ Explosive welding | SKD61:HRC53 SS400:HRC1 | SKD61:HRC53 SS400:HRC1 | — | — Could not be carried out | 50 μm | — |
| Comp Ex 2 | SKD11/SUS304 (5 mm/10 mm) | Explosive welding → Quenching→ Tempering × 1 time | SKD11:HRC21 SUS304:HRC23 | SKD61:HRC59 SUS304:HRC26 | 33 | 550 MPa/ SUS304 | 100 μm | Poor |

INDUSTRIAL APPLICABILITY

The cladding of the present application can be applied to members where there is contact between devices such as kneaders for production devices, extrusion members such as crushers, and members which reciprocate with a piston, and other members for heavy machinery and industrial equipment for high hardness materials or which crush and transport materials.

REFERENCE SIGNS LIST

1 soft steel
2 high hardness steel
3 extruder

The invention claimed is:

1. A cladding, comprising two or more layers including a first alloy and a second alloy bonded to the first alloy,
   wherein the second alloy has a hardness greater than that of the first alloy, the difference in the hardness between the first alloy and the second alloy is HRC 44 or more, and when a shear test in accordance with JIS G 0601 is performed on the cladding, breakage occurs on a first alloy side,
   wherein the second alloy is thinner than the first alloy, and
   wherein the second alloy is selected from SKD61, SKD1, SUS420J2 or NCF718.

2. The cladding according to claim 1, wherein when the cladding is inspected by the bottom echo method of the ultrasonic flaw detection test of JIS G 0601, no defects occur in a bonding interface between the first alloy and the second alloy.

3. The cladding according to claim 1, wherein when the cladding is inspected by the penetrant testing of ASME BPVC-VIII, a surface of the cladding is free of indication patterns, and a cross-section of the cladding is free of indication patterns having a length which exceeds three times a width of the indication patterns, is free of circular or elliptical indication patterns exceeding 5 mm, and does not have 4 or more indication patterns arranged in a straight line with an interval of 1.5 mm or less from end to end.

4. The cladding according to claim 1, wherein the hardness of the first alloy is HRC 5 or less.

5. The cladding according to claim 1, wherein the first alloy and the second alloy are directly bonded.

6. The cladding according to claim 1, wherein a wave height at the bonding interface between the first alloy and the second alloy is 30 μm to 1000 μm.

7. A method for the production of a cladding, comprising:
   bonding a first alloy and a second alloy thinner than the first alloy by explosive welding, wherein the second alloy is selected from SKD61, SKD1, SUS420J2 or NCF718, and
   subjecting the bonded second alloy to quenching and tempering heat treatment to harden the second alloy, such that the second alloy has a hardness greater than that of the first alloy and the difference in the hardness between the first alloy and the second alloy is HRC 44 or more.

8. A method, comprising:
   providing the cladding according to claim 1,
   chemically or mechanically fastening the first alloy of the cladding according to claim 1 to a member of an extruder or kneader such that the second alloy is positioned to receive an abrasion load that is applied to the member of the extruder or kneader, and
   exposing the second alloy of the member to an environment in which the second alloy the member of the extruder or kneader receives the abrasion load.

9. The cladding according to claim 2, wherein the hardness of the first alloy is HRC 5 or less.

10. The cladding according to claim 3, wherein the hardness of the first alloy is HRC 5 or less.

11. The cladding according to claim 1, wherein the hardness of the first alloy is HRC 4 or less.

12. The cladding according to claim 1, wherein the hardness of the first alloy is HRC 3 or less.

13. The method according to claim 8, wherein the hardness of the first alloy is HRC 5 or less.

* * * * *

UNITED STATES PATENT AND TRADEMARK OFFICE
CERTIFICATE OF CORRECTION

| | | |
|---|---|---|
| PATENT NO. | : 12,179,458 B2 | Page 1 of 1 |
| APPLICATION NO. | : 18/010635 | |
| DATED | : December 31, 2024 | |
| INVENTOR(S) | : Wada et al. | |

It is certified that error appears in the above-identified patent and that said Letters Patent is hereby corrected as shown below:

In the Claims

Column 16, Line 42 (Claim 8, Line 9), please change "alloy the" to -- alloy of the --

Signed and Sealed this
Tenth Day of June, 2025

Coke Morgan Stewart
*Acting Director of the United States Patent and Trademark Office*